United States Patent
Desmet et al.

(10) Patent No.: US 10,477,762 B2
(45) Date of Patent: Nov. 19, 2019

(54) RESIDUE MANAGEMENT SYSTEM WITH A SELECTION DOOR FOR AN AGRICULTURAL VEHICLE

(71) Applicant: CNH Industrial America LLC, New Holland, PA (US)

(72) Inventors: Stefaan Desmet, Nevele (BE); Nathan E. Isaac, Lancaster, PA (US); Tim Passchyn, Sint-Michiels (BE); Cooper W. Linde, Lancaster, PA (US)

(73) Assignee: CNH Industrial America LLC, New Holland, PA (US)

( * ) Notice: Subject to any disclaimer, the term of this patent is extended or adjusted under 35 U.S.C. 154(b) by 52 days.

(21) Appl. No.: 15/634,621

(22) Filed: Jun. 27, 2017

(65) Prior Publication Data
US 2018/0368319 A1    Dec. 27, 2018

(51) Int. Cl.
| A01D 41/12 | (2006.01) |
| A01F 12/40 | (2006.01) |
| A01F 12/44 | (2006.01) |
| A01F 17/02 | (2006.01) |

(52) U.S. Cl.
CPC .......... *A01D 41/1243* (2013.01); *A01F 12/40* (2013.01); *A01F 12/444* (2013.01); *A01F 17/02* (2013.01)

(58) Field of Classification Search
CPC ...... A01F 12/40; A01F 7/067; A01D 41/1243
See application file for complete search history.

(56) References Cited

U.S. PATENT DOCUMENTS

| 4,617,942 A | 10/1986 | Garner |
| 6,547,169 B1 * | 4/2003 | Matousek .......... A01D 41/1243 239/661 |
| 6,688,972 B2 | 2/2004 | Büermann et al. |
| 7,455,584 B2 | 11/2008 | Farley et al. |
| 7,717,779 B1 | 5/2010 | Weichholdt |
| 7,896,732 B2 | 3/2011 | Benes et al. |

(Continued)

FOREIGN PATENT DOCUMENTS

| DE | 102007005173 A1 * | 8/2008 | ......... A01D 41/1243 |
| DE | 102008001460 A1 | 2/2009 | |

(Continued)

OTHER PUBLICATIONS

European Search Report for European Application No. 18171509.5 dated Dec. 7, 2018 (6 pages).

*Primary Examiner* — Alicia Torres
(74) *Attorney, Agent, or Firm* — Peter K. Zacharias; Patrick M. Sheldrake

(57) ABSTRACT

A residue management system for an agricultural vehicle includes: a straw hood defining a first rear opening and a second rear opening; a windrow chute held adjacent to the first rear opening; a spreader assembly held adjacent to the second rear opening; a conveyor held within the straw hood and defining a conveyor axis of rotation; and a selection door pivotably coupled to the straw hood and defining a pivot axis which is rearward and below the conveyor axis of rotation, the selection door being configured to switch between a first position in which material from the conveyor is directed toward the first rear opening and a second position in which material from the conveyor is directed toward the second rear opening.

17 Claims, 9 Drawing Sheets

(56) References Cited

U.S. PATENT DOCUMENTS

| | | | |
|---|---|---|---|
| 8,616,945 B2 | 12/2013 | Ritter et al. | |
| 2002/0119809 A1* | 8/2002 | Bognar | A01F 12/40 460/112 |
| 2003/0114207 A1* | 6/2003 | Wolters | A01F 12/40 460/111 |
| 2004/0092298 A1* | 5/2004 | Holmen | A01D 41/1243 460/111 |
| 2004/0176150 A1* | 9/2004 | Gryspeerdt | A01D 41/1243 460/112 |
| 2005/0101363 A1* | 5/2005 | Farley | A01D 41/1243 460/112 |
| 2008/0305841 A1* | 12/2008 | Overschelde | A01D 41/1243 460/59 |
| 2009/0156277 A1* | 6/2009 | Benes | A01D 41/1243 460/112 |
| 2012/0270613 A1* | 10/2012 | Isaac | A01F 12/40 460/111 |
| 2012/0302300 A1 | 11/2012 | Holmén | |
| 2014/0066146 A1* | 3/2014 | Dilts | A01D 41/1243 460/111 |
| 2014/0364179 A1* | 12/2014 | Brinkmann | A01D 41/1243 460/112 |

FOREIGN PATENT DOCUMENTS

| | | | |
|---|---|---|---|
| EP | 3172959 A1 | 5/2017 | |
| WO | 2016/105457 A2 | 6/2016 | |
| WO | 2016105457 A2 | 6/2016 | |

* cited by examiner

RESIDUE MANAGEMENT SYSTEM WITH A SELECTION DOOR FOR AN AGRICULTURAL VEHICLE

FIELD OF THE INVENTION

The present invention pertains to agricultural vehicles and, more specifically, to agricultural vehicles which incorporate residue management systems.

BACKGROUND OF THE INVENTION

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue management system, which may utilize a straw chopper to process the non-grain material and direct it out the rear of the combine through a straw hood. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

During the process of harvesting in a combine, the desired grain is gathered and saved while crop material other than the desired grain is expelled from the combine. The non-grain crop material or crop residue is usually derived from two areas in the combine, the threshing rotor and the cleaning system. The material expelled from the threshing rotor is generally referred to as straw and includes much of the larger plant material such as stalks, stems, cobs leaves and the like as well as foreign or non-crop material. The material expelled from the cleaning system is generally referred to as chaff and includes much of the finer plant material residue, such as pods, husk fragments and particulates. The combined flows of crop residue to be expelled from the combine can be dealt with in several ways; however, the processes for redepositing the residue material back into the field can be categorized generally as either windrowing or spreading.

In a windrowing process, the crop residue is deposited by a windrow chute onto the harvested crop stubble in a continuous narrow stream or windrow, which is much narrower than the harvested swath width. Accumulated in this manner, the windrowed residue material can be picked up easily for baling or other subsequent processing or use.

In a spreading process, a mechanical device, which can be referred to as a spreader assembly, distributes the straw and/or chaff evenly across the extent of the combine header cutting width. The material to be spread is usually chopped to a short length so that after spreading the material will break down quickly to add nutrients to the soil and/or to be sufficiently small so as to not interfere with subsequent tilling or seeding operations.

In some instances, a user may wish to simultaneously windrow and spread residue on the field. Many residue management systems are incapable of effectively windrowing and spreading residue simultaneously due to the crop residue traveling through a single travel path in the straw hood; attempting to simultaneously windrow and spread crop residue in such configurations may undesirably intermix the straw and chaff.

What is needed in the art is an agricultural vehicle which can windrow straw and spread chaff simultaneously while keeping the straw and chaff separate.

SUMMARY OF THE INVENTION

In one exemplary embodiment formed in accordance with the present invention, there is provided a residue management system with a straw hood having a selection door which can direct material from a conveyor toward a first rear opening in a first position and direct material from the conveyor toward a second rear opening in a second position.

In another exemplary embodiment formed in accordance with the present invention, a residue management system for an agricultural vehicle includes: a straw hood defining a first rear opening and a second rear opening; a windrow chute held adjacent to the first rear opening; a spreader assembly held adjacent to the second rear opening; a conveyor held within the straw hood and defining a conveyor axis of rotation; and a selection door pivotably coupled to the straw hood and defining a pivot axis which is rearward and below the conveyor axis of rotation, the selection door being configured to switch between a first position in which material from the conveyor is directed toward the first rear opening and a second position in which material from the conveyor is directed toward the second rear opening.

In yet another exemplary embodiment formed in accordance with the present invention, an agricultural vehicle, includes: a chassis; a cleaning system carried by the chassis and including at least one cleaning fan; a chopper carried by the chassis; and a residue management system carried by the chassis rearwardly of the cleaning system and the chopper. The residue management system includes: a straw hood defining a first rear opening and a second rear opening; a windrow chute held adjacent to the first rear opening; a spreader assembly held adjacent to the second rear opening; a conveyor held within the straw hood and defining a conveyor axis of rotation; and a selection door pivotably coupled to the straw hood and defining a pivot axis which is rearward and below the conveyor axis of rotation, the selection door being configured to switch between a first position in which material from the conveyor is directed toward the first rear opening and a second position in which material from the conveyor is directed toward the second rear opening.

One potential advantage of exemplary embodiments of the residue management systems described herein is that straw can be effectively windrowed simultaneously with chaff being effectively spread.

Another potential advantage of exemplary embodiments of the residue management systems described herein is that the conveyor can clean an edge of the selection door to reduce the risk of wrapping and crop material backup as the conveyor rotates.

Yet another potential advantage of exemplary embodiments of the residue management systems described herein is that the selection door can be switched between the first position and second position during operation of the agricultural vehicle with minimal disruption to a harvesting procedure.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
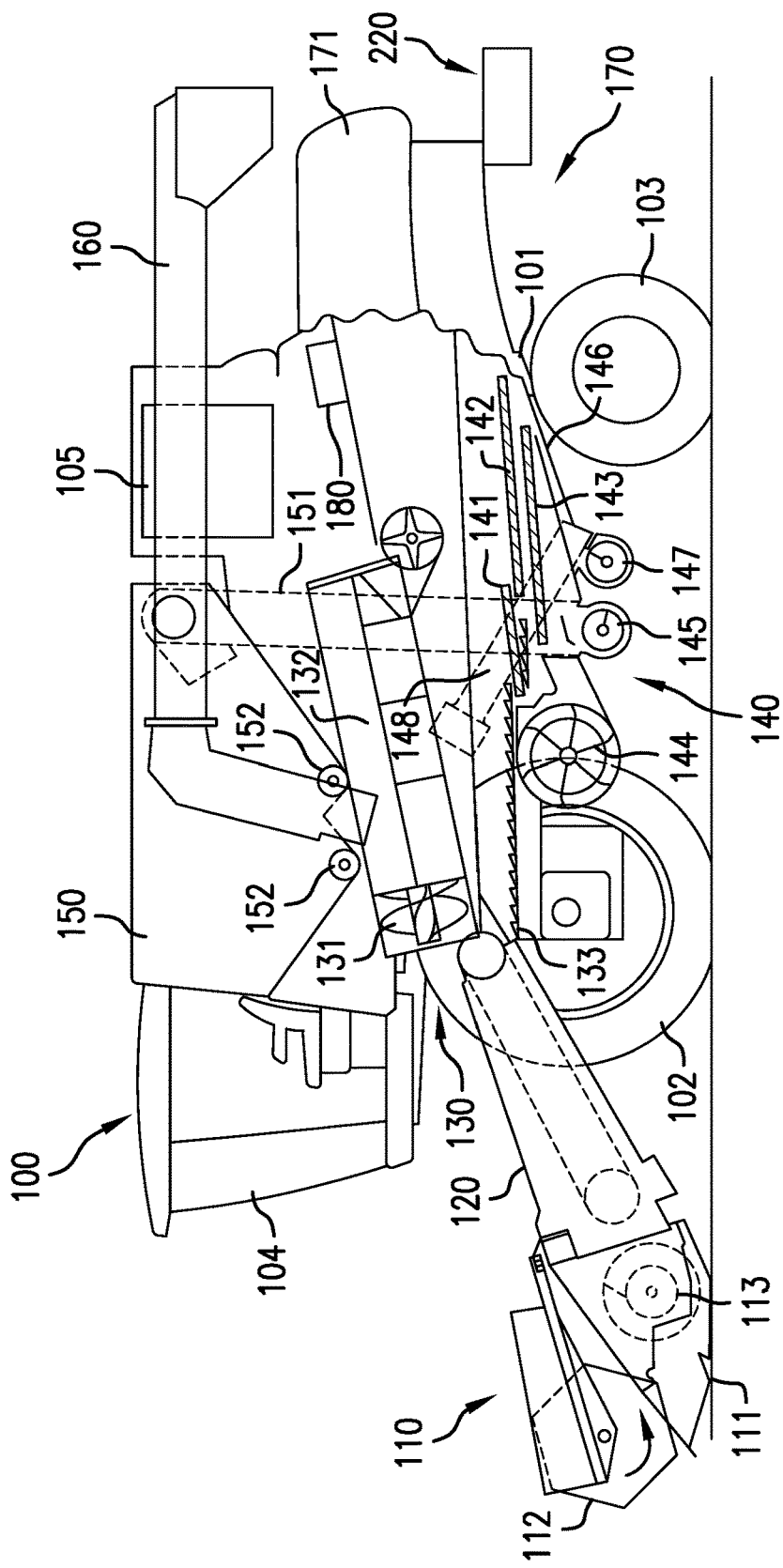
FIG. 1 illustrates a side view of an exemplary embodiment of an agricultural vehicle, the agricultural vehicle comprising a residue management system, in accordance with an exemplary embodiment of the present invention.

Referring now to the drawings, and more particularly to FIG. 1, there is shown an embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue management system 170 of combine 100. Optionally, the chaff and/or straw can proceed through a chopper 180 to be further processed into even smaller particles before discharge out of the combine 100. It should be appreciated that the "chopper" 180 referenced herein, which may include knives, may also be what is typically referred to as a "beater", which may include flails, or other construction and that the term "chopper" as used herein refers to any construction which can reduce the particle size of entering crop material by various actions including chopping, flailing, etc. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloader 160 for discharge from combine 100.

Figure 2:
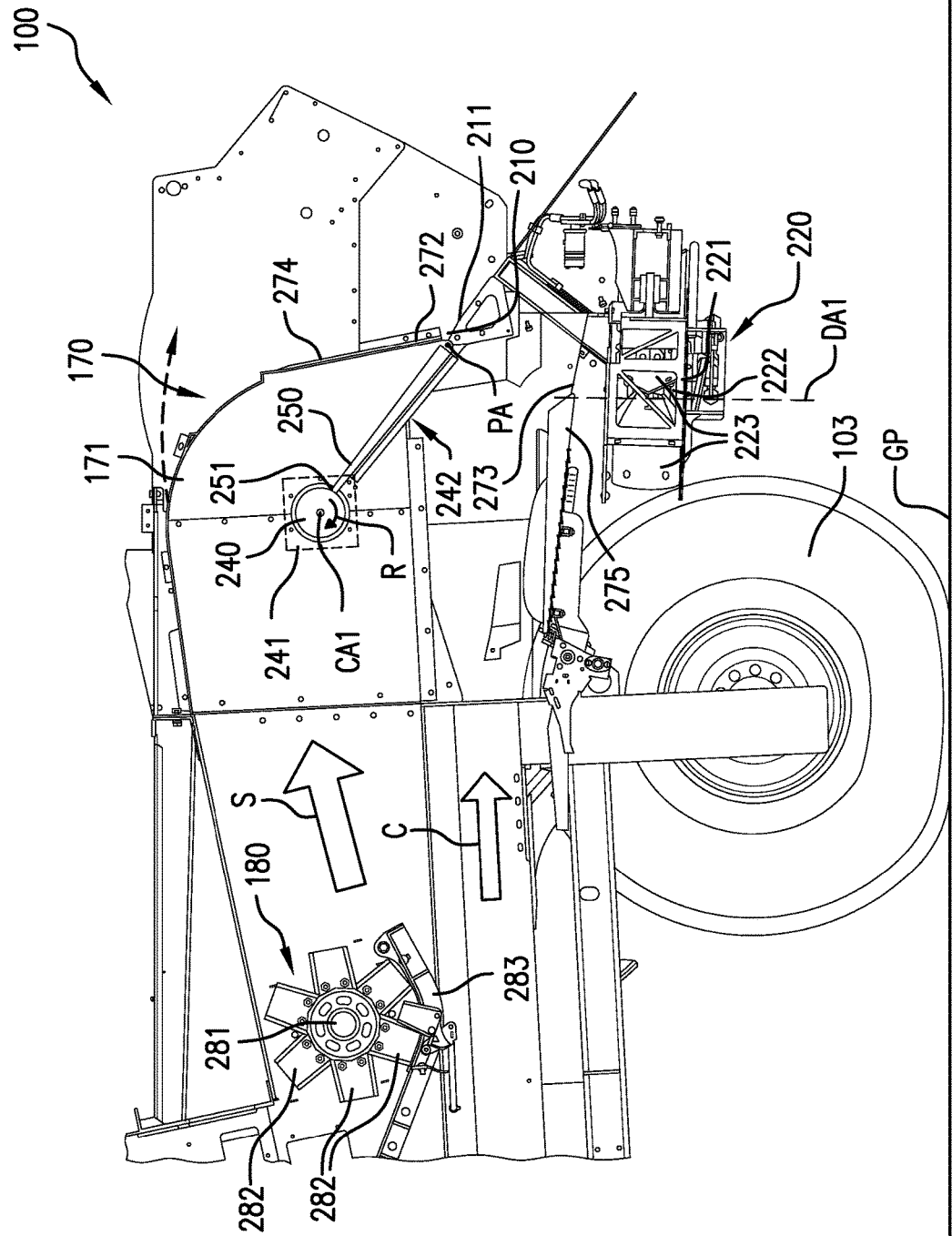
FIG. 2 illustrates a sectional view of the residue management system of the agricultural vehicle of FIG. 1 with a selection door in a first position, in accordance with an exemplary embodiment of the present invention.

Referring now to FIG. 2, a sectional view of an exemplary embodiment of the residue management system 170 formed in accordance with the present invention is shown and generally includes the straw hood 171 defining a first rear opening 272 and a second rear opening 273, a windrow chute 210 held adjacent to the first rear opening 272, a spreader assembly 220 held adjacent to the second rear opening 273, a conveyor 240 held within the straw hood 171, and a selection door 250 pivotably coupled to straw hood 171. As used herein, the windrow chute 210 and spreader assembly 220 are "held adjacent" to the first rear opening 272 and second rear opening 273, respectively, in the sense that crop material flowing through the first rear opening 272, such as straw, will tend to flow onto the windrow chute 210 for windrowing and crop material flowing through the second rear opening 273, such as chaff, will tend to flow into the spreader assembly 220 for spreading. As shown, the windrow chute 210 can define a chute surface 211 placed under the first rear opening 272, which can be formed in a rear surface 274 of the straw hood 171, so material falling through the first rear opening 272, due to gravity or otherwise, can fall onto the chute surface 211 and windrow onto a field. Similarly, the spreader assembly 220 can be placed underneath the second rear opening 273, which can be formed in a bottom surface 275 of the straw hood 171, so material falling through the second rear opening 273, due to gravity or otherwise, can fall onto a spreader surface 221 of the spreader assembly 220 for spreading by one or more spreader discs 222 and fins 223 rotating about a disc axis DA1, which is shown as being generally perpendicular to a ground plane GP on which the agricultural vehicle 100 is resting. It should be appreciated that the previously described arrangements of the windrow chute 210 and spreader assembly 220 are exemplary only, and there are other ways of arranging the windrow chute 210 and spreader assembly 220 adjacent to the first rear opening 272 and second rear opening 273, respectively, to allow for windrowing and spreading according to the present invention.

As can be seen, the conveyor 240 can be rotatably mounted within the straw hood 171 and define a conveyor axis of rotation CA1 which is approximately in a middle of a length L of the straw hood 171. As shown, the conveyor 240 can be a generally cylindrical roller with the conveyor axis of rotation CA1 defining the longitudinal axis of roller, but it should be appreciated that the conveyor 240 can incorporate other elements, such as a conveyor belt driven by the roller 240, or be a different type of conveyor, such as an auger. The conveyor 240 can be rotated by a powered rotary actuator 241, as shown, which may be electrically, hydraulically, and/or pneumatically powered. Alternatively, the conveyor 240 may be self-powered by, for example, incorporating fins (not shown) on the conveyor 240 which are pushed by crop material traveling across the conveyor 240 to rotate the conveyor 240. The conveyor 240 can be configured to receive a flow of material, indicated by arrow S in FIG. 2, from the chopper 180 during harvesting. As previously described, the chopper 180 can include a chopper shaft 281 rotatably carrying a plurality of chopper knives 282 and have a concave pan 283 which crop material travels across during rotation of the chopper shaft 281 and carried chopper knives 282. It should be appreciated that the chopper 180 can also be a different type of chopper configuration, such as a beater, as previously described. After the crop material S passes the chopper 180, the crop material S can flow to the conveyor 240, which can rotate in a direction indicated by arrow R, toward the rear of the agricultural vehicle 100.

To windrow the material S from the chopper 180, the selection door 250 can have a first position, illustrated in FIG. 2, in which the material S from the chopper 180 moved by the conveyor 240 is directed toward the first rear opening 272 so the material S can flow onto the windrow chute 210. As can be seen in FIG. 2, the selection door 250 can have a leading edge 251 which is adjacent to the conveyor 240 so the material coming off of the conveyor 240 travels across the selection door 250, out the first rear opening 272, and onto the windrow chute 210 for windrowing. While it is not necessary to have the leading edge 251 of the selection door 250 adjacent to the conveyor 240, such a configuration is useful as the rotation of the conveyor 240 adjacent to the leading edge 251 can reduce the risk of crop material getting stuck and stagnating on the leading edge 251 of the selection door 250, reducing the risk of backup at the transition between the conveyor 240 and the selection door 250 at the leading edge 251 of the selection door 250. It should therefore be appreciated that, as used herein, the leading edge 251 of the selection door 250 can be "adjacent to" the conveyor 240 in the sense that the clearance between the leading edge 251 of the selection door 250 and the conveyor 240 is small enough that the conveyor 240 can tend to break up and discourage buildup of crop material on the leading edge 251 of the selection door 250.

As can be further seen in FIG. 2, another crop material flow, such as chaff directed by the cleaning fan 144 indicated as arrow C, can enter the straw hood 171 and be directed toward the second rear opening 273 to fall onto the spreader assembly 220 for spreading. To reduce the possibility of the flow of chaff C intermixing with the material flow S from the chopper 180, the selection door 250 and conveyor 240 together can block flow of the chaff C toward the first rear opening 272 when the selection door 250 is in the first position, as shown. In this sense, a gap 242 can be defined between the conveyor 240 and the first opening 272 in the straw hood 171 which is bridged by the selection door 250 in the first position, so the material flow S from the chopper 180 can continuously flow from the conveyor 240 out the first opening 272 by rolling across the selection door 250, while also significantly reducing the risk of the chaff C intermixing with the material S while being windrowed.

By having the selection door 250 in the first position as shown in FIG. 2, the crop material S from the chopper 180 can be effectively windrowed by the windrow chute 210 simultaneously with spreading the flow of chaff C from the cleaning fan 144 by the spreader assembly 220. The first position of the selection door 250 can segregate the flow of chaff C from the material flow S during the windrowing, which may be desired by a user in some instances. During windrowing, the chopper 180 may be controlled to only coarsely chop the material S into relatively large pieces which can be easily picked up by, for example, a baler.

In some instances, a user may wish for the material flow S from the chopper 180 to also be spread by the spreader assembly 220 onto the field. In such instances, the chopper 180 can be controlled to finely chop the material S into relatively small pieces for spreading. Since the selection door 250, in the first position, directs the material S from the chopper 180 toward the first rear opening 272, which goes to the windrow chute 250 and not the spreader assembly 220, the material S from the chopper 180 may be prevented from reaching the second rear opening 273, and therefore the spreader assembly 220, when the selection door 250 is in the first position.

Figure 3:
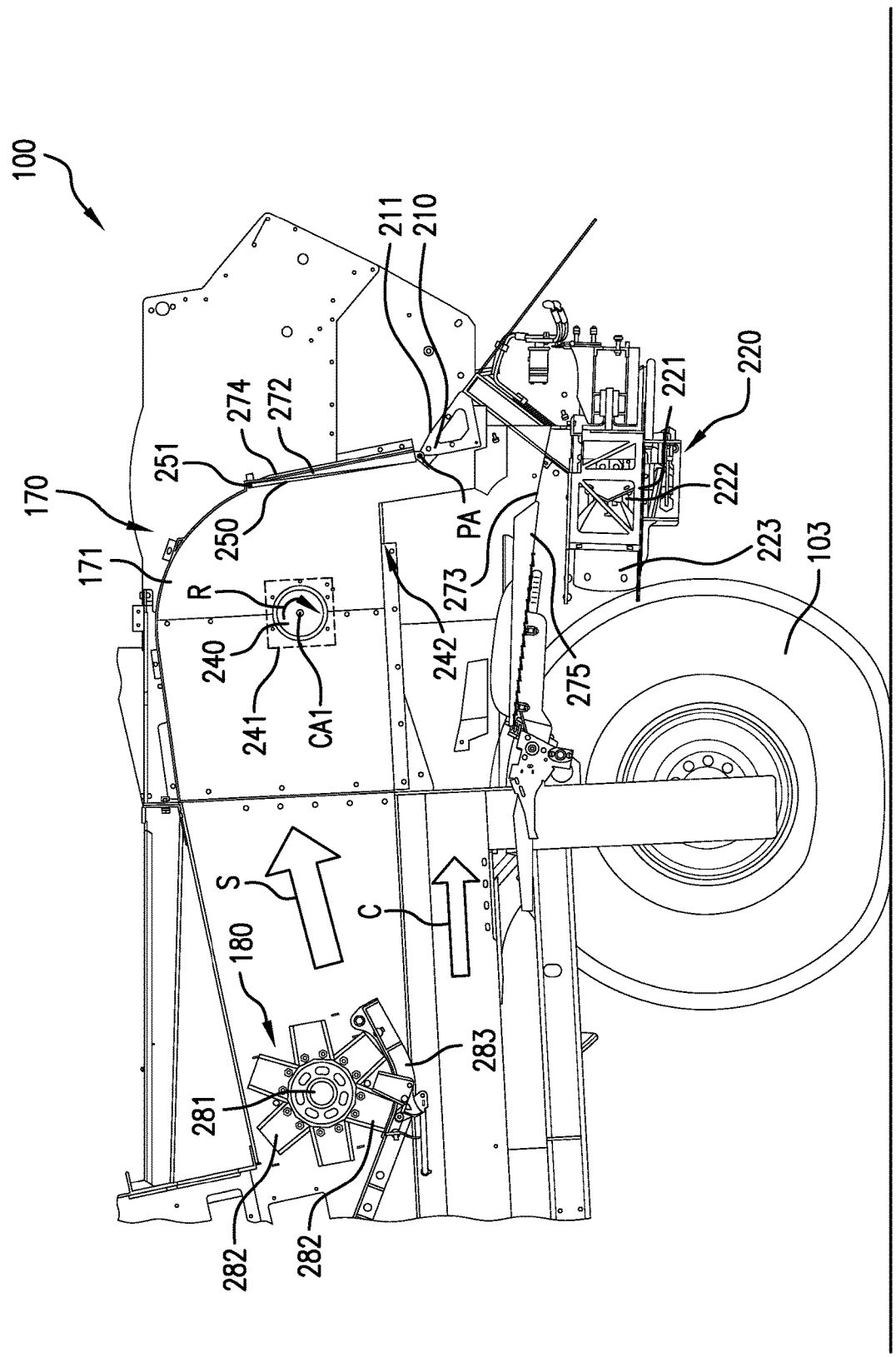
FIG. 3 illustrates a sectional view of the residue management system shown in FIG. 2 with the selection door in a second position, in accordance with an exemplary embodiment of the present invention.

To direct the material S from the chopper 180 to the second rear opening 273, and referring now to FIG. 3, the selection door 250 can have a second position in which the material S from the chopper 180 is directed toward the second rear opening 273 by the selection door 250, rather than the first rear opening 272. As can be seen, the selection door 250 has pivoted about a pivot axis PA between the first position shown in FIG. 2 and the second position shown in FIG. 3. The pivot axis PA is below and rearward of the conveyor axis of rotation CA1 so the selection door 250 can bridge the gap 242 between the conveyor 240 and the first rear opening 272 in the first position and also expose the gap 242 in the second position so material flow S coming off the conveyor 240 from the chopper 180 will be directed toward the second rear opening 273 and spreader assembly 220 when the selection door 250 is in the second position. Thus, when the selection door 250 is in the second position, both material flows S and C from the chopper 180 and cleaning fan 144, respectively, can be directed toward the spreader assembly 220 for spreading. The pivot axis PA of the selection door 250 can be defined near the first rear opening 272 of the straw hood 171 to bridge the gap 242 in the first position and expose the gap 242 in the second position. The pivot axis PA of the selection door 250 can also be located rearwardly of the disc axis DA1 of the spreader disc 222 so material directed by the selection door 250 toward the second rear opening 273 can reach the spreader disc 222 for spreading.

Figure 4:
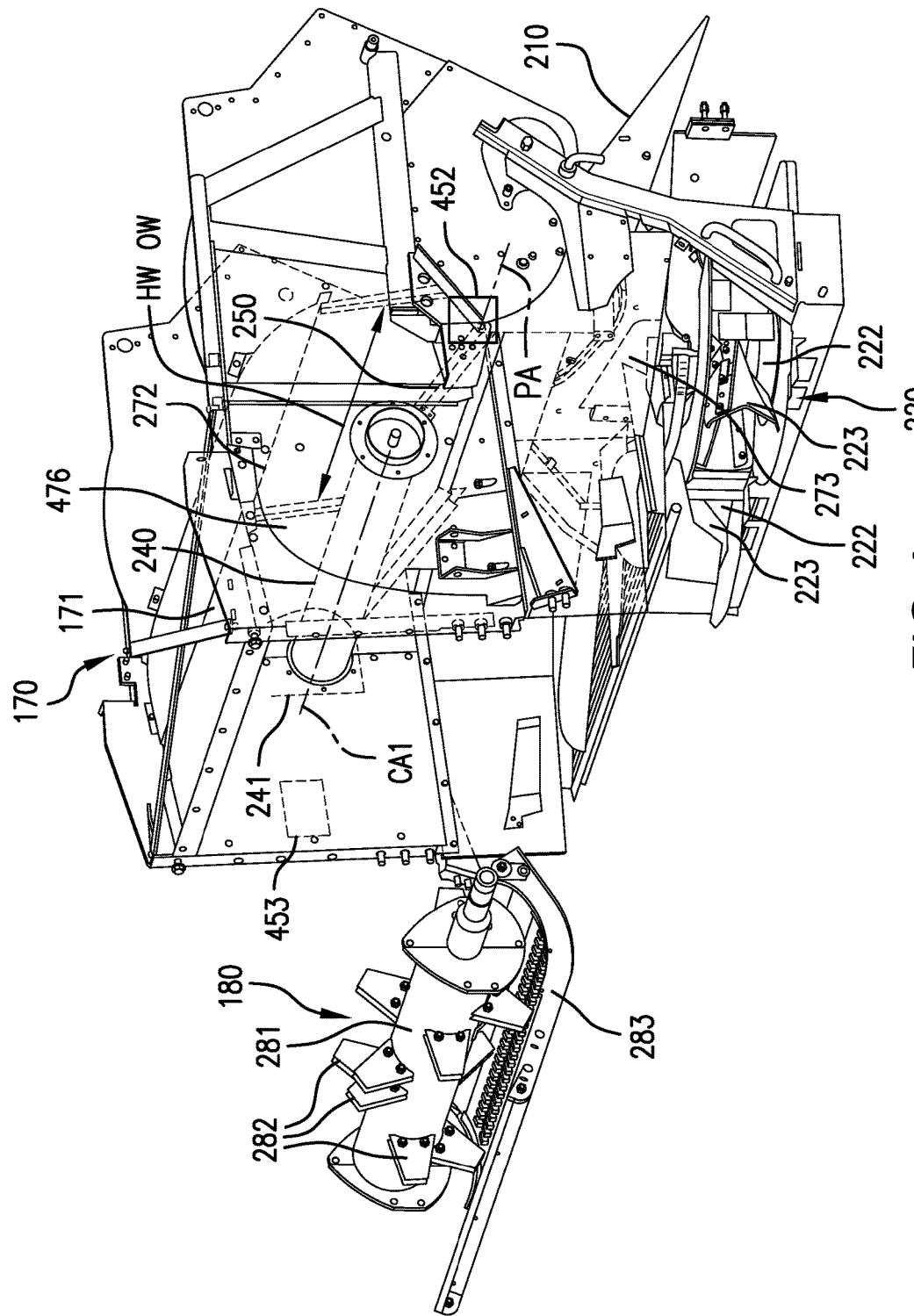
FIG. 4 illustrates another sectional view of the residue management system shown in FIGS. 2-3 with the selection door in the first position, in accordance with an exemplary embodiment of the present invention.
Figure 5:
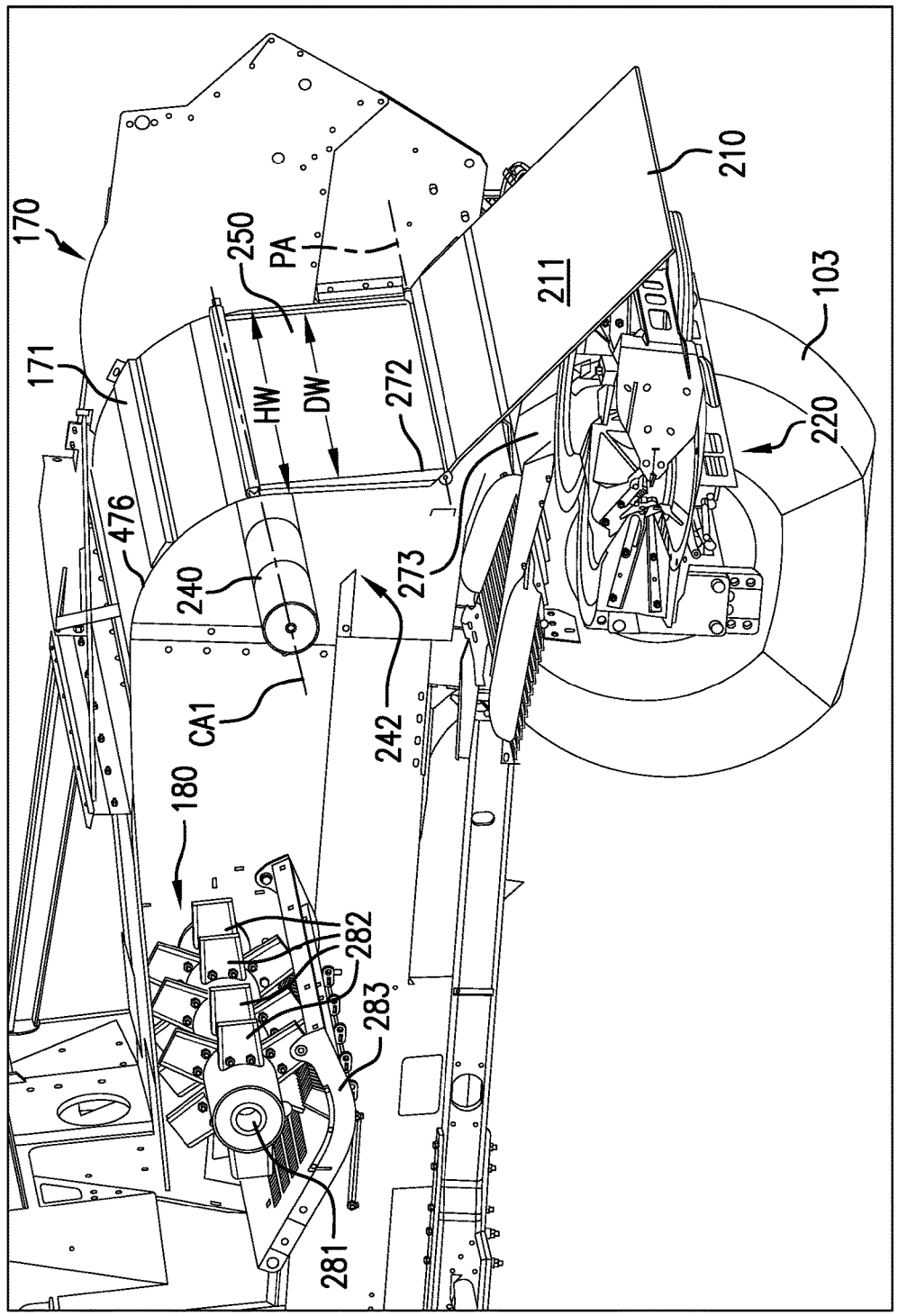
FIG. 5 illustrates a partial sectional view of the agricultural vehicle shown in FIG. 1 when the selection door of the residue management system is in the second position, in accordance with an exemplary embodiment of the present invention.

Referring now to FIGS. 4 and 5, additional partial sectional views of the agricultural vehicle 100, and specifically the residue management system 170, are shown, with the selection door 250 being shown in the first position in FIG. 4 and the second position in FIG. 5. As can be seen, the selection door 250 can be pivotably connected to side sheets 476 of the straw hood 171 so the selection door 250 can define a door width DW which is substantially equal to a hood width HW of the straw hood 171, which may also substantially define an opening width OW of the first rear opening 272. As can be seen, the straw hood 171 may be formed to have a partially arced shape. As can be appreciated from FIGS. 4 and 5, the first rear opening 272 can be completely open, i.e., uncovered, when the selection door 250 is in the first position to reduce the obstruction of material flow through the first rear opening 272 as material S from the chopper 180 and conveyor 240 is directed toward the windrow chute 210. When the selection door 250 is in the second position, on the other hand, the first rear opening 272 can be completely covered by the selection door 250 so little, if any, material can flow through the first rear opening 272 to the windrow chute 210. It should be appreciated that while the first rear opening 272 is shown as being completely covered by the selection door 250 when the selection door 250 is in the second position, the selection door 250 does not need to completely cover the first rear opening 272 in the second position to direct crop material from the conveyor 240 toward the second rear opening 273; in some exemplary embodiments, the selection door 250 can have a second position directing crop material from the conveyor 240 toward the second rear opening 273 which is intermediate the fully open position shown in FIGS. 2 and 4 and the fully closed position shown in FIGS. 3 and 5. It should be appreciated that the selection door 250 can also include a latching pin (not shown) or other mechanism for holding the selection door 250 in a desired position during operation.

To control pivoting of the selection door 250 between the first position and the second position, a door actuator 452 (shown in FIG. 4) can be connected to the selection door 250 and configured to pivot the selection door 250 about the pivot axis PA. The door actuator 452 may be, for example, an electrically, hydraulically, and/or pneumatically powered actuator which can linearly or rotatably force the selection door 250 to cause pivoting of the selection door 250 about the pivot axis PA. Many such actuators are known, so further description of the construction of the door actuator 452 is omitted. A controller 453, also shown in FIG. 4, can be operationally coupled to the door actuator 452 and configured to control the position of the selection door 250 based on operating conditions of the agricultural vehicle 100 and/or input commands from a user. For example, the controller 453 may be controlled by a user using a display screen (not shown) in the operator cab 104 to switch the residue management system 170 from a windrowing mode to a spreading mode, causing the controller 453 to correspondingly control the door actuator 452 to move the selection door 250 from the first position to the second position. Optionally, the controller 453 can also be operationally coupled to the rotary actuator 241 linked to the conveyor 240 and configured to control the rotary actuator 241 so the conveyor 240 only rotates about the conveyor axis of rotation CA1 when the residue management system 170 is in the windrowing mode, i.e., when the selection door 250 is directing crop material S from the conveyor 240 toward the first rear opening 272. The controller 453 can be any type of analog and/or digital circuit capable of controlling operationally coupled elements, with many such constructions known, so further description of the construction of the controller 453 is omitted.

Figure 6:
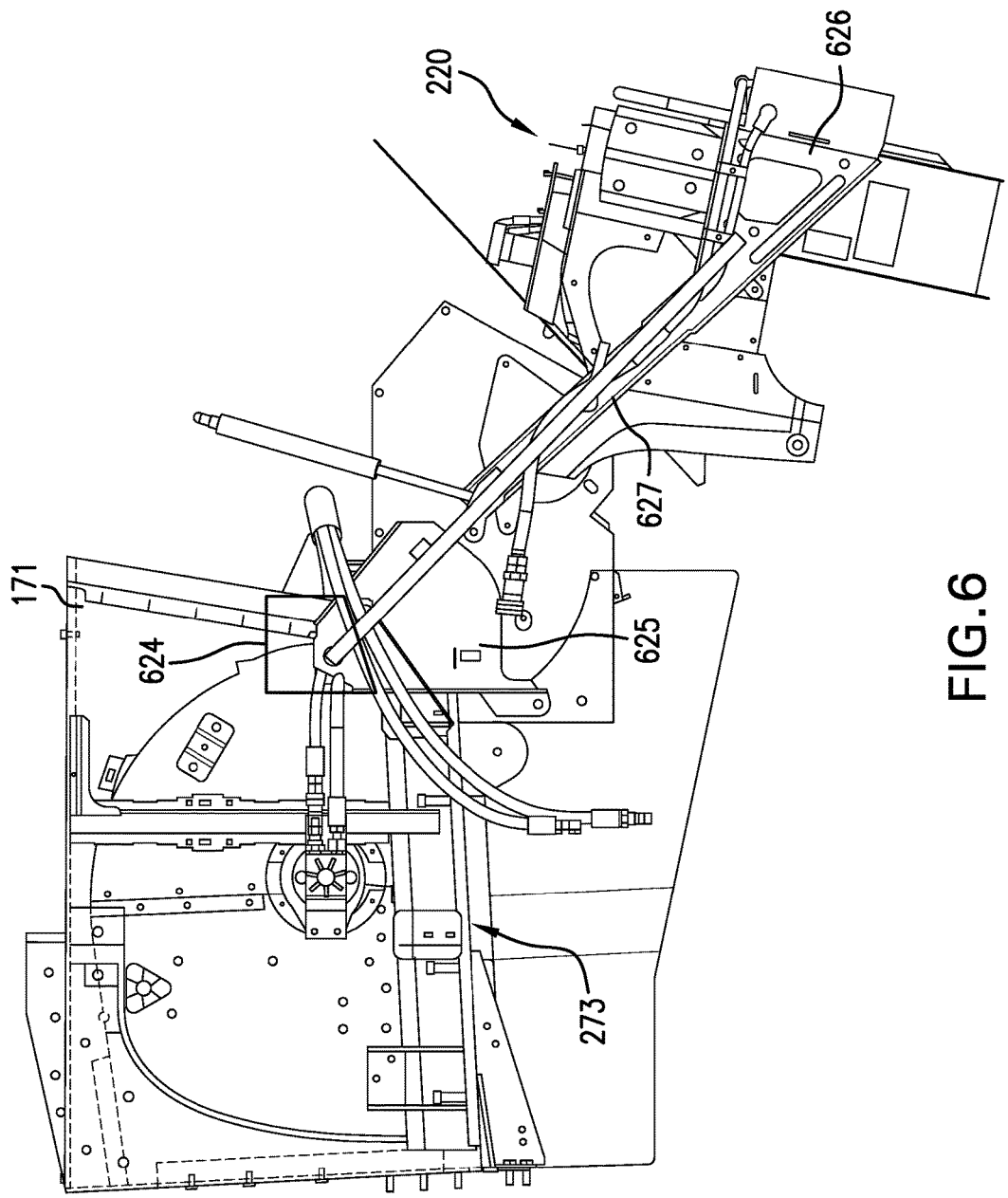
FIG. 6 illustrates a perspective view of the residue management system of the agricultural vehicle shown in FIG. 1 with a spreader assembly which is pivotable relative to a straw hood of the residue management system, in accordance with an exemplary embodiment of the present invention.

Referring now to FIG. 6, the spreader assembly 220 is shown after being pivoted by a spreader actuator 624 to a rearward storage position. The spreader actuator 624 can be a pneumatic or hydraulic actuator which rotates a pivoting bracket 625 connected to the straw hood 171 and linked to a spreader carrier 626 by a spreader arm 627 for pivoting the spreader assembly 220 between the operational position shown in FIGS. 2-5 and the storage position shown in FIG. 6. The spreader actuator 624 can also be operationally coupled to and controlled by the controller 453 to switch the spreader assembly 220 between the operational position and the storage position. Such control of spreader assemblies is known, so further description of the manner of controlling the position of the spreader assembly 220 is omitted.

Figure 7:
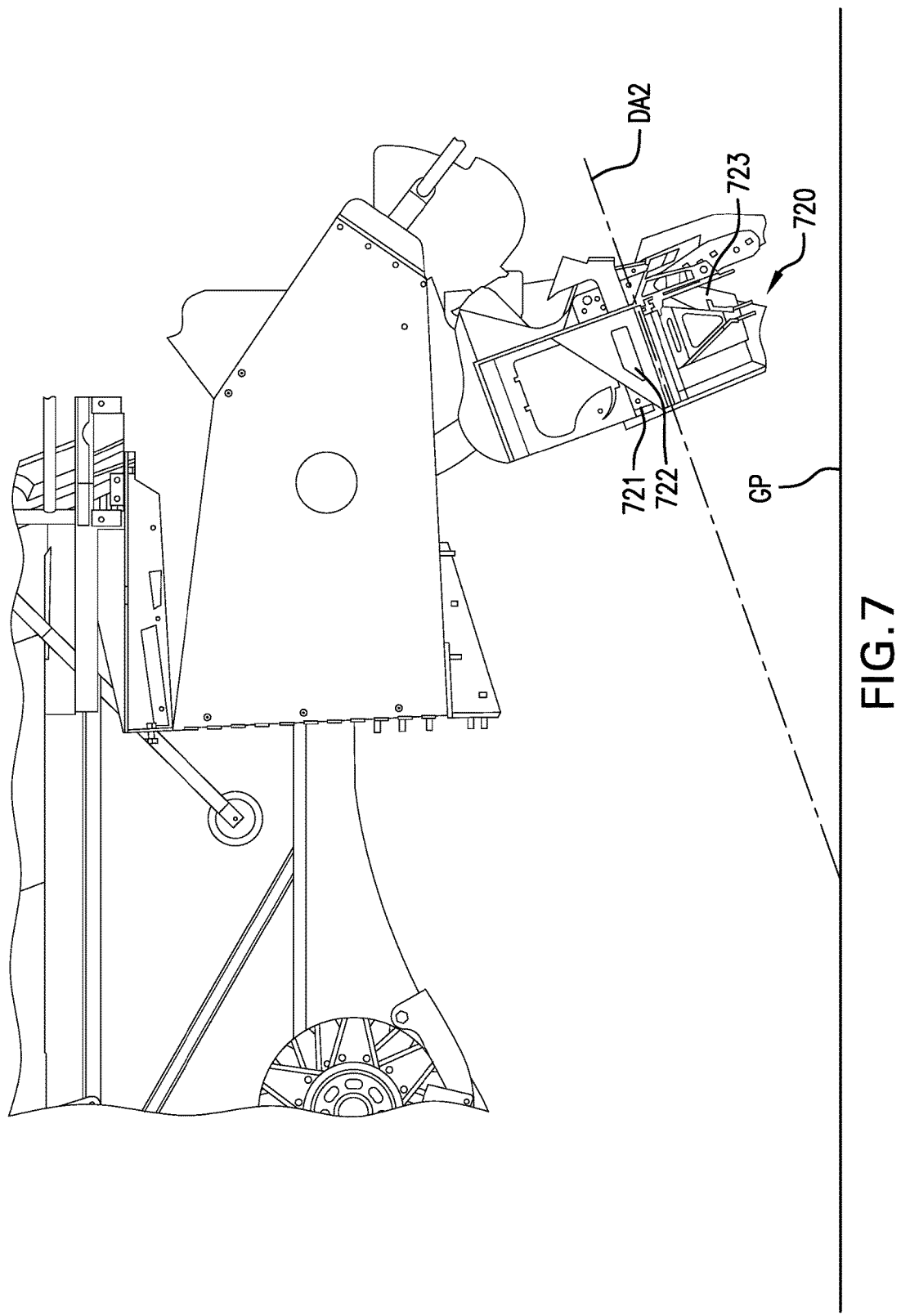
FIG. 7 illustrates an alternative exemplary embodiment of a residue management system of the agricultural vehicle in FIG. 1 with a spreader assembly which is angled relative to a ground plane, in accordance with an exemplary embodiment of the present invention.

Referring now to FIG. 7, the residue management assembly 170 is shown with an alternative exemplary embodiment of a spreader assembly 720 formed in accordance with the present invention. The spreader assembly 720 shown in FIG. 7 can be similar to the previously described spreader assembly 220 shown in FIGS. 2-6, except one or more spreader discs 722 rotating fins 723 on a spreader surface 721 of the spreader assembly 720 may rotate about a disc axis DA2 which is angled with respect to the ground plane GP on which the agricultural vehicle 100 rests. As opposed to the spreader assembly 220, which may be referred to as a "vertical" spreader due to the orientation of the disc axis DA1 relative to the ground plane GP, the spreader assembly 720, which may be referred to as a "horizontal" spreader due to the orientation of the disc axis DA2 relative to the ground plane GP, can have a different spread profile due to the angling of the disc axis DA2 relative to the ground plane GP. In other respects, the spreader assembly 720 may be similar to the previously described spreader assembly 220.

Figure 8:
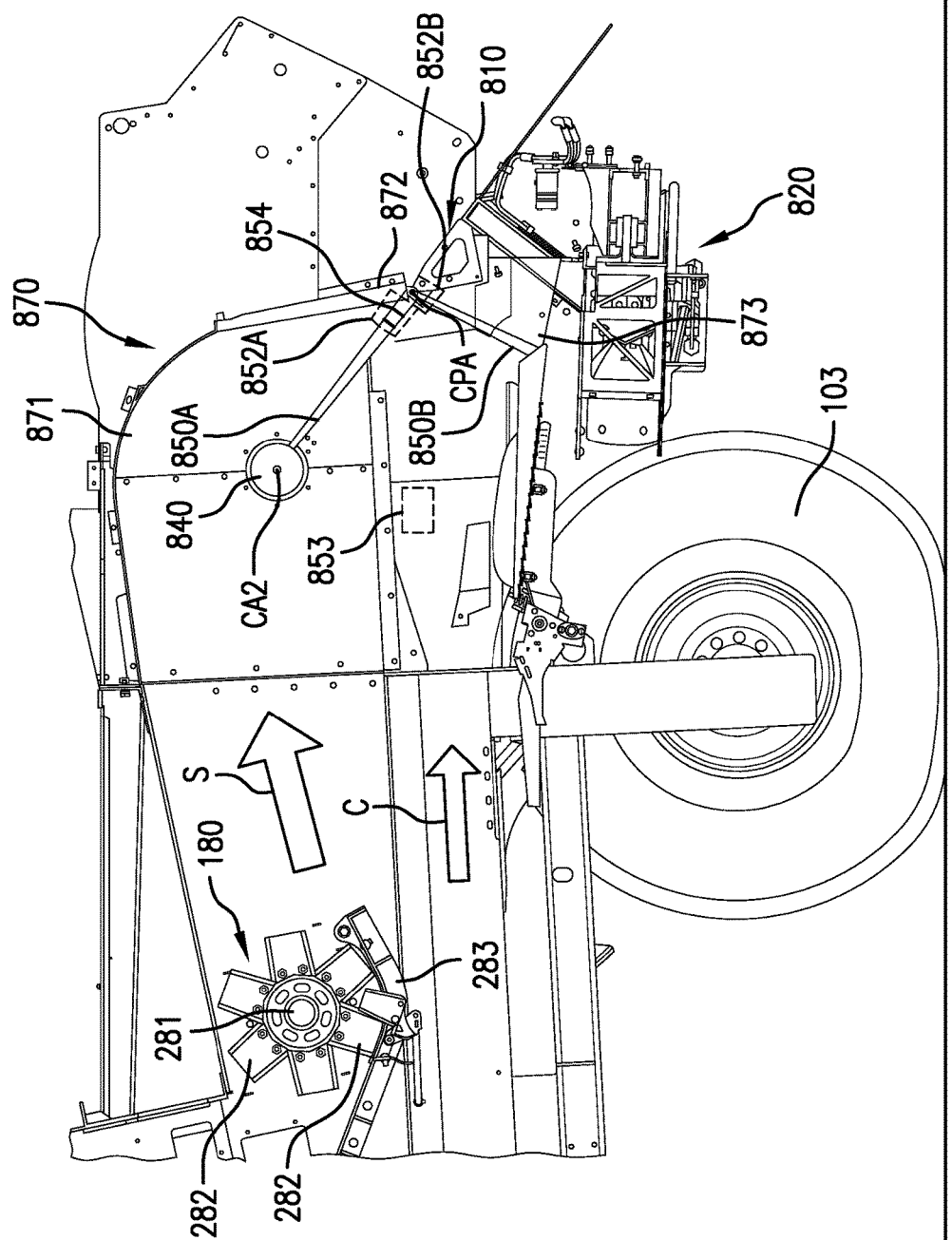
FIG. 8 illustrates yet another alternative exemplary embodiment of a residue management system of the agricultural vehicle in FIG.1 which includes a selection door and a second selection door in a first position, in accordance with an exemplary embodiment of the present invention.
Figure 9:
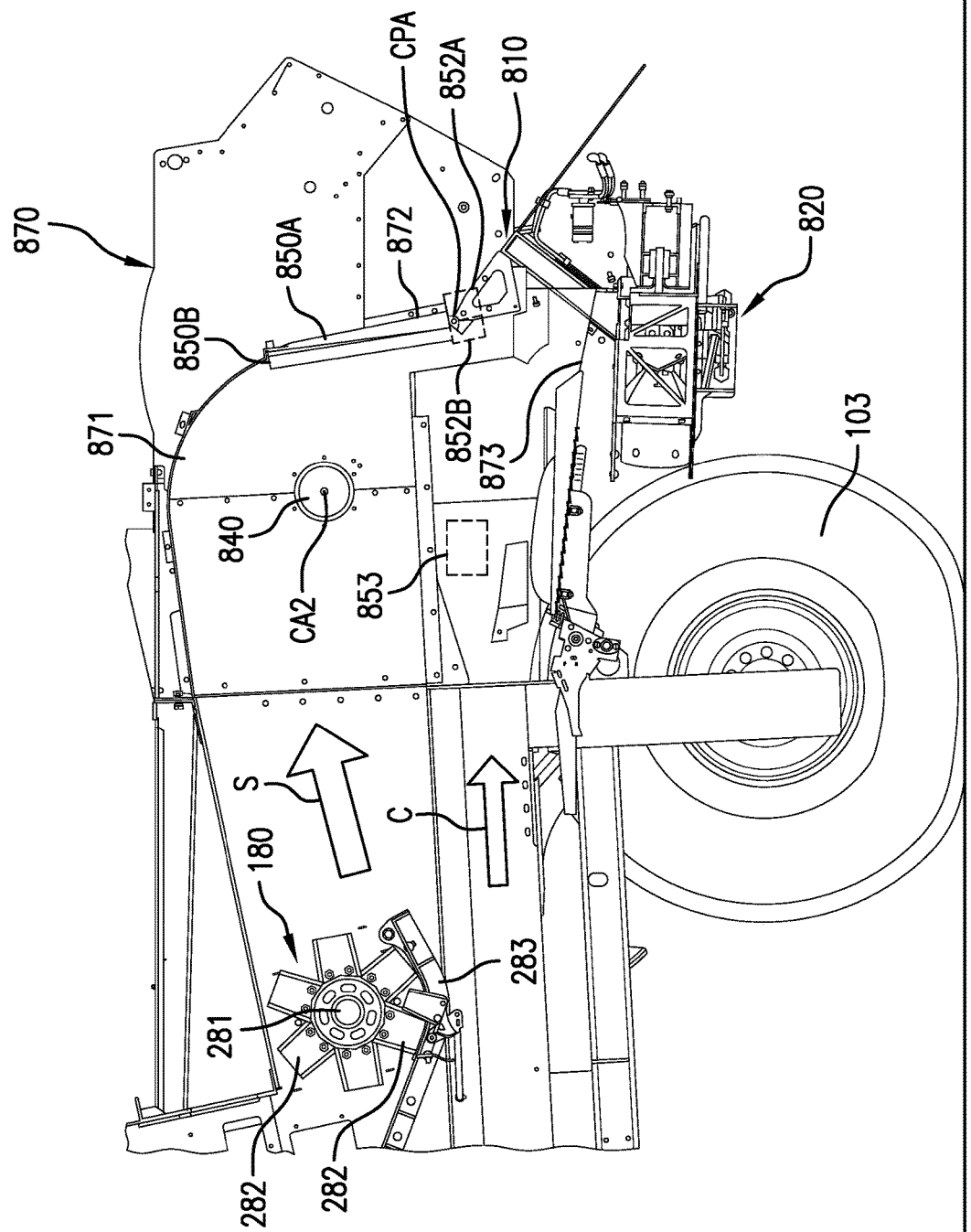
FIG. 9 illustrates the residue management system shown in FIG. 8 with the selection door and the second selection door in a second position, in accordance with an exemplary embodiment of the present invention.

Referring now to FIGS. 8-9, yet another exemplary embodiment of a residue management system 870 formed in accordance with the present invention is shown. The residue management system 870, similarly to the previously described residue management system 170, includes a straw hood 871 defining a first rear opening 872 and a second rear opening 873, a windrow chute 810 held adjacent to the first rear opening 872, a spreader assembly 820 held adjacent to the second rear opening 873, a conveyor 840 held within the straw hood 871, a first selection door 850A pivotably coupled to straw hood 871, and a second selection door 850B pivotably coupled to the straw hood 871. As should be appreciated from FIGS. 8-9, the residue management system 870 can be similar to the previously described residue management system 170 shown in FIGS. 2-7, with the main difference being the addition of the second selection door 850B in the residue management system 870; further discussion of similar elements between the two residue management systems 170 and 870 is therefore omitted. As can be seen in FIGS. 8-9, the first selection door 850A and second selection door 850B can both be pivotably coupled to the straw hood 871 so the first selection door 850A and second selection door 850B can both pivot about a common pivot axis CPA which is arranged rearwardly and below a conveyor axis of rotation CA2 of the conveyor 840. While the first selection door 850A and second selection door 850B are shown as pivoting about a pivot axis CPA which is common to both selection doors 850A, 850B, it should be appreciated that each selection door 850A, 850B can pivot about a respective pivot axis, if desired. Pivoting of the first selection door 850A about the common pivot axis CPA can be caused by a first door actuator 852A linked to the first selection door 850A and pivoting of the second selection door 850B about the common pivot axis CPA can be caused by a second door actuator 852B linked to the second selection door 850B, with both door actuators 852A, 852B being operationally coupled to and controlled by a controller 853, similar to the previously described selection door 250 pivoted by the door actuator 252.

Referring specifically now to FIG. 8, the first selection door 850A and second selection door 850B are both shown in a respective first position. As can be seen, a material flow S from the conveyor 840 can be directed toward the first rear opening 872 by the first selection door 850A for windrowing by the windrow chute 810, similar to the previously described first position of the selection door 250, and a material flow C from the cleaning fan 144 can be blocked from exiting through the second rear opening 873 by the second selection door 850B covering the second rear opening 873 to prevent spreading by the spreader assembly 820. In one exemplary embodiment, the first selection door 850A can include one or more slots 854 formed in the first selection door 850A near the common pivot axis CPA so the material flow C from the cleaning fan 144 can be directed by the second selection door 850 out the first rear opening 872 to the windrow chute 810. Since the size of the particles of the material flow C can be relatively small compared to the material flow S from the conveyor 840, the slot(s) 854 formed in the first selection door 850A can be sized and/or angled to allow free flow of the material C through the slot(s) 854 with a minimal risk of the material flow S from the conveyor 840 entering the slot(s) 854. By having the first selection door 850A and second selection door 850B in their respective first positions shown in FIG. 8, material flow S from the conveyor 840 can be directed out the first rear opening 872 to the windrow chute 810 and material flow C from the cleaning fan 144 can be prevented from reaching the second rear opening 873 to the spreader assembly 820 and, optionally, directed out the first rear opening 872 to the windrow chute 810 as well. It should be appreciated that the first position of the second selection door 850B shown in FIG. 8 may also correspond to a third position of a single selection door, such as the previously described selection door 250.

Referring specifically now to FIG. 9, the first selection door 850A and second selection door 850B are both shown in a respective second position. As can be seen, the first selection door 850A and second selection door 850B are substantially stacked on one another in the same second position as the previously described selection door 250 so the selection doors 850A, 850B can direct material flow S from the conveyor 840 toward the second rear opening 873 for spreading and prevent the material flow S from exiting through the first rear opening 872. In most other aspects, the second position of both the first selection door 850A and second selection door 850B can be similar to the second position of the previously described selection door 250.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A residue management system for an agricultural vehicle, comprising:
   a straw hood defining a first rear opening and a second rear opening;
   a windrow chute held adjacent to the first rear opening;
   a spreader assembly held adjacent to the second rear opening;
   a conveyor held within the straw hood and defining a conveyor axis of rotation;
   a first selection door pivotably coupled to the straw hood and defining a pivot axis which is rearward and below the conveyor axis of rotation, the selection door configured to switch between a first position in which material from the conveyor is directed toward the first rear opening and a second position in which material from the conveyor is directed toward the second rear opening; and
   a second selection door pivotably coupled to the straw hood, the second selection door pivotable about the pivot axis and defining a first position where the second selection door covers the second rear opening and prevents material flow to the spreader assembly.

2. The residue management system of claim 1, wherein the selection door at least partially covers the first rear opening in the second position.

3. The residue management system of claim 2, wherein the selection door completely covers the first rear opening in the second position.

4. The residue management system of claim 1, wherein the selection door defines a door leading edge held adjacent to the conveyor in the first position.

5. The residue management system of claim 4, wherein the conveyor is a roller.

6. The residue management system of claim 1, wherein the spreader assembly includes at least one spreader disc defining a disc axis.

7. The residue management system of claim 6, wherein the disc axis is one of generally perpendicular to a ground plane and angled with respect to the ground plane.

8. An agricultural vehicle, comprising:
a chassis;
a cleaning system carried by the chassis and including a cleaning fan;
a chopper carried by the chassis; and
a residue management system carried by the chassis rearwardly of the cleaning system and the chopper, the residue management system comprising:
a straw hood defining a first rear opening and a second rear opening;
a windrow chute held adjacent to the first rear opening;
a spreader assembly held adjacent to the second rear opening;
a conveyor held within the straw hood and defining a conveyor axis of rotation; and
a selection door pivotably coupled to the straw hood and defining a pivot axis which is rearward and below the conveyor axis of rotation, the selection door configured to switch between a first position in which material from the conveyor is directed toward the first rear opening and a second position in which material from the conveyor is directed toward the second rear opening.

9. The agricultural vehicle of claim 8, wherein the selection door at least partially covers the first rear opening in the second position.

10. The agricultural vehicle of claim 9, wherein the selection door completely covers the first rear opening in the second position.

11. The agricultural vehicle of claim 8, wherein the selection door defines a door leading edge held adjacent to the conveyor in the first position.

12. The agricultural vehicle of claim 11, wherein the conveyor is a roller.

13. The agricultural vehicle of claim 8, wherein the spreader assembly includes at least one spreader disc defining a disc axis.

14. The agricultural vehicle of claim 13, wherein the disc axis is one of generally perpendicular to a ground plane and angled with respect to the ground plane.

15. The agricultural vehicle of claim 8, wherein the conveyor is arranged to receive crop material from the chopper.

16. The agricultural vehicle of claim 8, further comprising a second selection door pivotably coupled to the straw hood.

17. The agricultural vehicle of claim 16, wherein the second selection door is also pivotable about the pivot axis.

* * * * *